(12) United States Patent
Fischer et al.

(10) Patent No.: US 11,880,970 B2
(45) Date of Patent: Jan. 23, 2024

(54) DEVICE AND METHOD FOR EVALUATING THE COMPOSITION OF A STREAM OF HARVESTED MATERIAL

(71) Applicant: CLAAS Selbstfahrende Erntemaschinen GmbH, Harsewinkel (DE)

(72) Inventors: Frédéric Fischer, Arnsberg (DE); Johann Witte, Fröndenberg (DE); Boris Kettelhoit, Gütersloh (DE); Torben Töniges, Bielefeld (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 210 days.

(21) Appl. No.: 17/472,083

(22) Filed: Sep. 10, 2021

(65) Prior Publication Data
US 2022/0084191 A1   Mar. 17, 2022

(30) Foreign Application Priority Data

Sep. 16, 2020  (DE) .......................... 102020124201.8
Jun. 28, 2021  (DE) .......................... 102021116566.0

(51) Int. Cl.
| | | |
|---|---|---|
| *G06T 7/00* | (2017.01) | |
| *A01D 41/127* | (2006.01) | |
| *G06F 18/2431* | (2023.01) | |

(52) U.S. Cl.
CPC ........ *G06T 7/0004* (2013.01); *A01D 41/1277* (2013.01); *G06F 18/2431* (2023.01); *G06T 2207/30128* (2013.01)

(58) Field of Classification Search
CPC .......................... G06T 7/0004; G06F 18/2431
See application file for complete search history.

(56) References Cited

U.S. PATENT DOCUMENTS

| | | | |
|---|---|---|---|
| 7,001,267 B2 | 2/2006 | Behnke et al. | |
| 9,648,807 B2 | 5/2017 | Escher et al. | |
| (Continued) | | | |

OTHER PUBLICATIONS

Siddagangappa, Megha R., and A. H. Kulkarni. "Classification and quality analysis of food grains." IOSR Journal of Computer Engineering (IOSR-JCE) 16.4 (2014): 01-10.

(Continued)

*Primary Examiner* — Sam Bhattacharya
(74) *Attorney, Agent, or Firm* — Lempia Summerfield Katz LLC

(57) ABSTRACT

A device and a method for determining a portion of broken grain and/or non-grain components in a stream of harvested material is disclosed. The device includes a camera to generate images of the stream of harvested material and an evaluation unit to estimate the portion in an image supplied by the camera. The evaluation unit includes a first-order classifier to estimate a first parameter of the stream of harvested material, and a plurality of second-order classifiers assigned to various values of the first parameter to estimate the portion in a stream of harvested material that has the assigned parameter value. The evaluation unit, with assistance of the first-order classifier, estimates a value of the first parameter using a first number of images of the camera, and then selects the second-order classifier assigned to the value of the first parameter to estimate the portion with assistance of the selected second-order classifier.

20 Claims, 3 Drawing Sheets

(56) References Cited

U.S. PATENT DOCUMENTS

| | | |
|---|---|---|
| 2018/0084708 A1 | 3/2018 | Neitemeier et al. |
| 2019/0069487 A1 | 3/2019 | Schwarz |
| 2019/0069490 A1 | 3/2019 | Schwarz |
| 2020/0084965 A1 | 3/2020 | Neitemeier et al. |
| 2020/0084967 A1 | 3/2020 | Corban et al. |

OTHER PUBLICATIONS

Vithu, P., and J. A. Moses. "Machine vision system for food grain quality evaluation: A review." Trends in Food Science & Technology 56 (2016): 13-20.

European Search Report for European application No. 21189022.3-1207 dated Jan. 26, 2022.

DEVICE AND METHOD FOR EVALUATING THE COMPOSITION OF A STREAM OF HARVESTED MATERIAL

CROSS REFERENCE TO RELATED APPLICATIONS

This application claims priority under 35 U.S.C. § 119 to German Patent Application No. DE 102020124201.8 filed Sep. 16, 2020, and to German Patent Application No. DE 102021116566.0, filed Jun. 28, 2021, the entire disclosures of both of which are hereby incorporated by reference herein.

TECHNICAL FIELD

The present invention relates to a device and a method for the computerized evaluation of a portion of broken grain and/or non-grain components in a stream of harvested material, a harvester in which such a device is used, and a computer program that enables a computer to execute the method.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Progress in computer engineering, such as in the field of artificial intelligence, enables automating and optimizing control processes practical that were previously performed by humans based on experience and intuition. At the same time, such control processes require great effort, both in the development and in the subsequent practical deployment, particularly when considering several parameters that are not readily objectifiable.

U.S. Pat. No. 9,648,807 (B2), incorporated by reference herein in its entirety, discloses a combine with a camera oriented toward a stream of harvested material whose images are evaluated by computer in order to quantify and quantify broken grain and impurities.

US Patent Application Publication No. 2018/0084708 A1, incorporated by reference herein in its entirety, uses computer image processing to recognize anomalies in the environment of an agricultural work machine and to render more effective the operation of the machine, for example by automatically circumventing a detected obstacle, selective processing or non-processing of weed components, etc.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
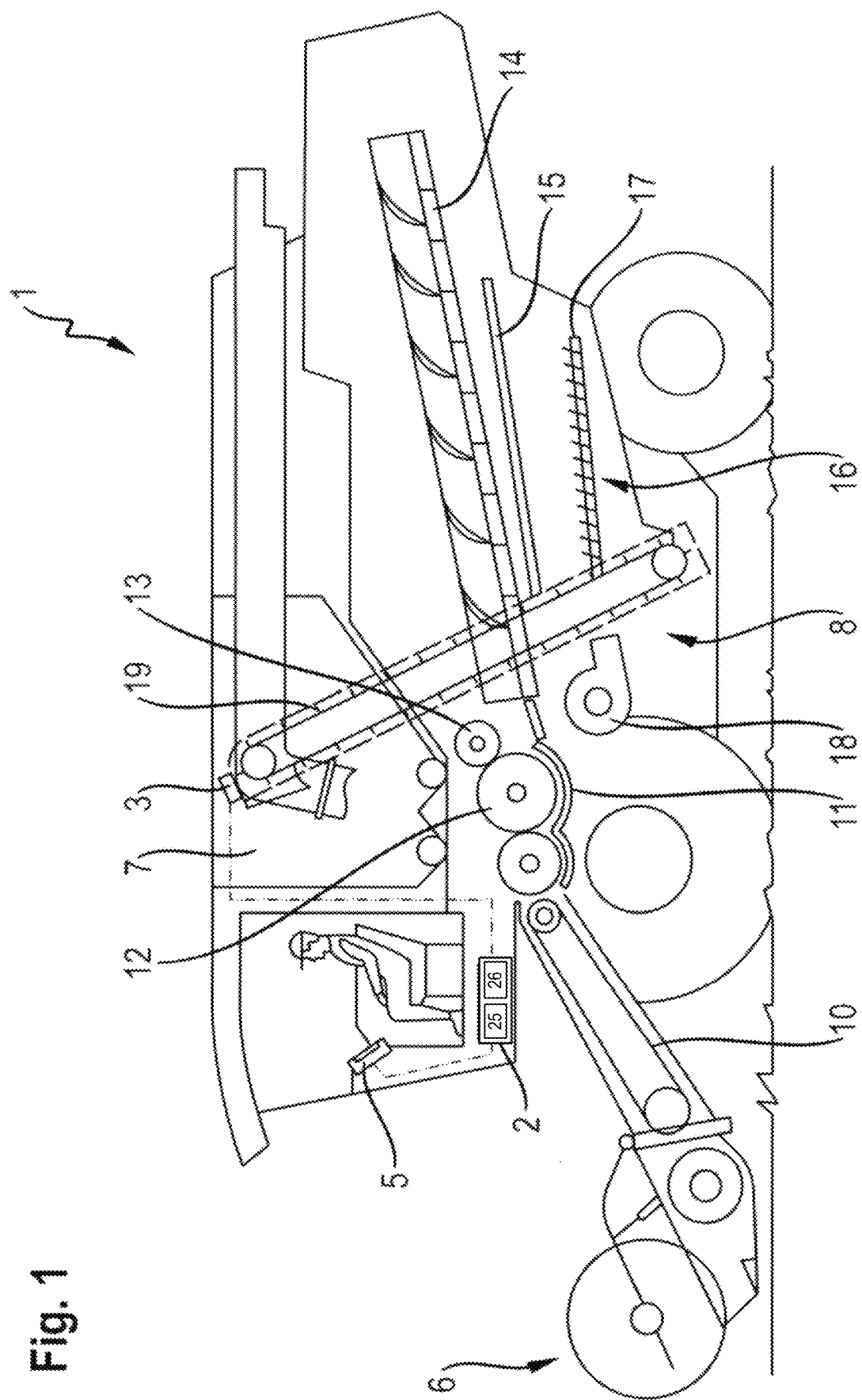
FIG. 1 illustrates a combine according to the invention.

Computer evaluation of images to quantify broken grain and impurities may require significant computing effort, with the costs of the computer system needed to evaluate the images being correspondingly high. Likewise, computer image processing to recognize and consider a large range or diversity of potential anomalies necessitate a great amount of development and computing effort.

Self-learning algorithms such as neural networks, deep learning or support vector machines do promise a reduction of programming effort in development, but also require a large amount of computing effort to process the process data influenced by several parameters. Further, the amount of example data that is needed to train the algorithms and the required learning time increases dramatically with the complexity of the problem.

In one or some embodiments, a device and a method for determining a portion of cracked grain and/or non-grain components in a stream of harvested material is disclosed that is economically feasible, and that yields a robust result with less computing effort.

This may be achieved in that, in a device for determining a portion of broken grain and/or non-grain components in a stream of harvested material with a camera for generating images of the stream of harvested material and an evaluation unit for estimating the portion in an image supplied by the camera, the evaluation unit comprises a first-order classifier to estimate a first parameter of the stream of harvested material, and one or more (such as a plurality) of second-order classifiers assigned to various values of the first parameter to estimate the portion in a stream of harvested material that has the assigned parameter value. The evaluation unit is configured, with the assistance of the first-order classifier, first to estimate a value of the first parameter using a first number of images of the camera, and then to select the second-order classifier (from the plurality of second-order classifiers) that is assigned to the value of the first parameter in order to estimate the portion with the assistance of the selected second-order classifier.

A classifier in this context may be understood to be any type of computer system, or process that may be executed on a computer system, that is capable of appropriately classifying an input data set into one of several categories, be it by using rules specified by a programmer when developing the classifier, or as a result of a learning process by using example data sets for which the assigned category is previously known and may be used to check and correct the assignment results of the classifier. In particular, a classifier may be implemented as a neural network.

If a program that cannot learn is developed to solve a given classification problem, the knowledge required to solve the problem may be incorporated in the program text by the programmer. The associated effort must be all the greater the greater the number of potential classification results. In contrast, a self-learning system, such as a neural network, does not require prior knowledge of the problem to be solved, but instead effectively learns by trial and error using the example data sets; however, such a learning process is also all the more tedious and its success is all the more uncertain the greater the number of potential classification results. In one or some embodiments, it is noted that, in many practical classification tasks, the large number of potential results comes from combinations of values of different parameters. If, for example, a first parameter may assume n different values and a second may assume m different values, up to n*m different combinations are possible. If, contrastingly, the task is divided into sequential steps, then it is enough for a first-order classifier to be able to distinguish between n different cases, and a second-order classifier selected with the assistance of the first-order classifier differentiates between m different cases. This not only reduces the computing effort in evaluating a given set of process data, but also the development effort required for providing the program.

The first and second-order classifiers may, but do not have to, use the same images. In fact, in one or some embodiments, it may be more helpful to initially use a first number of images from a camera that continuously supplies new images to estimate the value of the first parameter, and to select the second-order classifier corresponding to this value, and then apply it to new images (different from the first number of images) in order to minimize the storage space.

Further, in one or some embodiments, the first parameter is discrete-valued (e.g., has a finite number of discrete values), and at most one second-order classifier is assigned to each of the possible discrete values of the first parameter.

If the first parameter is a slowly or rarely changing parameter, then, if its value has been estimated, the second-order classifier selected on the basis of this estimation may be used to evaluate a large number of images without having to repeat the analysis by the first-order classifier. This may thus significantly reduce the computing effort.

In one or some embodiments, a decision as to when there should be another evaluation by the first-order classifier may, in the simplest case, be made by a human user. Alternatively, this is performed fully automatically; to this end, at least one of the second-order classifiers is configured to determine a confidence level for the estimated second parameter, and the evaluation unit causes the first-order classifier to evaluate at least one new number of images in order to re-estimate the first parameter once the confidence level falls below a threshold (e.g., the evaluation unit is triggered, responsive to determining that the confidence level is at or below a threshold, to invoke the first-order classifier). This may comprise a measure of the certainty with which the broken or non-grain portion was estimated; if this measure is low, then it may be an indication that the second-order classifier "incapable of doing anything" with the current process data because the second-order classifier did not have the value of the first parameter for which the second-order classifier is configured.

In one or some embodiments, the first parameter may designate the type and/or variety of harvested material.

The approach may be transferred to the mode of operation of the first-order classifier itself: for its part, it may comprise a first-order sub-classifier and one or several second-order sub-classifiers, wherein the first-order sub-classifier is configured to estimate a value of a second parameter by using a number of images from the camera, and the first-order classifier is configured to select one of the second-order sub-classifiers by using the estimated value. Accordingly, for example, the first-order sub-classifier may be designed to differentiate between various types of harvested material such as corn, wheat, soy, etc. (e.g., the potential types of harvested material), whereas the second-order sub-classifiers may be specific to the selected type, such as corn, and may be designed to identify various varieties or various types of corn (e.g., select the variety from the potential varieties).

In one or some embodiments, at least some of the classifiers, such as one or several second-order classifiers, may learn. In particular, the training of the second-order classifiers may be greatly simplified since each of them need only be trained with training data sets whose value of the first parameter has the value assigned to the respective second-order classifier. For example, each individual classifier only has to be able to supply a useful evaluation of the broken or non-grain component for a certain variety of harvested material and is therefore also only trained with images of this variety. In this way, the first-order and second-order classifiers may be trained by using images of streams of harvested material and known portions of the imaged streams of harvested material. Accordingly, significantly faster and more reliable learning is possible than when training has to be performed with images of different varieties or event types.

A self-propelled harvester, such as a combine, may be equipped with the above-described device, for example to provide a driver information in real time on the broken portion and/or non-grain portion in the processed stream of harvested material, and to make it easier for the driver to optimize parameters of this processing, or to enable fully automated regulation of the processing parameters.

For example, in one or some embodiments, the self-propelled harvester includes: one some or all of a threshing units, a separating device, or a cleaning device; a display; and a device configured to determine a portion of one or both of broken grain or non-grain components in a stream of harvested material, the device include: a camera configured to generate images of the stream of harvested material; and an evaluation unit configured to estimate the portion in an image generated by the camera; wherein the evaluation unit comprises a first-order classifier configured to estimate a first parameter of the stream of harvested material, and a plurality of second-order classifiers assigned to various values of the first parameter to estimate the portion in a stream of harvested material that has the assigned parameter value; wherein the evaluation unit is configured to: estimate, using the first-order classifier, at least one value of the first parameter using one or more images of the camera; and select the second-order classifier assigned to the at least one value of the first parameter; estimate, using the selected second-order classifier, the portion of one or both of broken grain or non-grain components; and perform at least one of: cause modification of at least one aspect of the self-propelled harvester thereby modifying a process of the self-propelled harvester with respect to at least one of throughput, grain loss or the broken grain portion; or cause display of the determined broken grain portions in order to allow a driver of the self-propelled harvester to make adaptations or modifications to operating parameters of the process of the self-propelled harvester.

In one or some embodiments, a method for performing any one, any combination, or all of the actions described herein is disclosed. For example, a method for determining a portion of broken grain and/or non-grain components in a stream of harvested material is disclosed and includes:
  a) providing a number of images of a harvested material,
  b) providing a first-order classifier that is configured to estimate a first parameter of a stream of harvested material by using an image of the stream of harvested material, and a plurality of second-order classifiers that are each assigned to a given value of the first parameter and are configured to estimate the portion under the assumption that the first parameter has the assigned value;
  c) using the first-order classifier to estimate a value of a first parameter;
  d) by using the estimated value, selecting a second-order classifier from a plurality of second-order classifiers; and
  e) using the selected second-order classifier to obtain an estimated value of the share.

The images may be provided sequentially from a camera.

In one or some embodiments, the provision of second-order classifiers includes the training of some or each second-order classifier by using images of a stream of harvested material whose first parameter has the value assigned to the second-order classifier.

The diverse second-order classifiers may each be provided based on a same original classifier, such as a generic neural network in that an example of the original classifier is trained with images of a stream of harvested material whose first parameter has the value assigned to the second-order classifier, such as with images of the type or variety of a harvested material for which the second-order classifier will later be used.

In one or some embodiments, a non-transitory computer-readable medium for determining a portion of one or both of broken grain or non-grain components in a stream of harvested material is disclosed. The non-transitory computer-readable medium comprises instructions stored thereon, that when executed on a processor, perform the steps of: accessing a number of images of a harvested material; accessing a first-order classifier that is configured to estimate a first parameter of a stream of harvested material by using at least one image of the stream of harvested material, and a plurality of second-order classifiers that are each assigned to a given value of the first parameter and are configured to estimate the portion under an assumption that the first parameter has the assigned value; using the first-order classifier to estimate a value of a first parameter; by using the estimated value, selecting a second-order classifier from a plurality of second-order classifiers; and using the selected second-order classifier in order to obtain an estimated value of the portion of one or both of broken grain or non-grain components. The value of the first parameter may be estimated using a first set of images and the first-order classifier, and the portion of one or both of broken grain or non-grain components may be estimated using a second set of images different from the first set of images and the selected second-order classifier. Further, training each respective second-order classifier may be by using images of a stream of harvested material whose first parameter has the value assigned to the respective second-order classifier. In addition, the second-order classifiers may be generated by: providing an original classifier; and generating each of the second-order classifiers from the original classifier by training using images of a stream of harvested material whose first parameter has the value assigned to the second-order classifier.

Referring to the figures, FIG. 1 shows a combine 1 in a schematic, partially cutaway side view. The combine 1 bears an exchangeable harvesting header 6 for cutting and picking up the harvested material from the field. An inclined conveyor 10 feeds the cut harvested material from a threshing unit 12 enclosed by a threshing concave 11. From there, the stream of harvested material passes over a deflection drum 13 into the separating device 14 designed here as a separating rotor from which freely movable grains of the stream of harvested material are separated downwards. The stream of grains passes via a returns pan 15 to a cleaning device 16 that, as shown in FIG. 1, comprises (or consists of) several screening levels 17 and a blower 18. After the stream of grains is freed here from undesirable components such as husks and pieces of ears, it passes via a grain elevator 19 to a grain tank 7.

Various parameters of any one, any combination, or all of the threshing units 12, the separating device 14 and the cleaning device 16 such as the speeds of drums, screens and blower, gap widths, etc. may be adjusted in a known manner by a data processing system 2 in order to optimize the threshing process with respect to throughput, grain loss or broken grain portion. See U.S. Pat. No. 7,001,267; US Patent Application Publication No. 2019/0069487 A1; US Patent Application Publication No. 2019/0069490 A1; US Patent Application Publication No. 2020/0084965 A1 each of which are incorporated by reference herein in their entirety. In order to estimate the broken grain portion, a camera 3 is oriented toward the stream of grains, such as, for example, at the head end of the elevator 19. The camera 3 supplies images (such as in a regular sequence) to an evaluation unit 4 of the data processing system 2.

The data processing system 2 may comprise any type of computing functionality, such as at least one processor 25 (which may comprise a microprocessor, controller, PLA, or the like) and at least one memory 26 in order to perform the disclosed analysis and control of the various work assemblies, and/or any other processing disclosed herein. The memory may comprise any type of storage device (e.g., any type of memory). Though the processor 25 and memory 26 are depicted as separate elements, they may be part of a single machine, which includes a microprocessor (or other type of controller) and a memory. Examples of computer-readable media include computer-readable non-transitory storage media, such as a random-access memory (RAM), which may be SRAM, DRAM, SDRAM, or the like, read-only memory (ROM) 708, which may be PROM, EPROM, EEPROM, or the like. RAM and ROM hold user and system data and programs, as is known in the art. Thus, the processor 25 and/or the memory 26 may include a computer-readable medium for determining a portion of one or both of broken grain or non-grain components in a stream of harvested material, comprising instructions stored thereon, that when executed on a processor 25, performs any one, any combination, or all of the steps described herein.

The processor 25 and memory 26 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Figure 2:
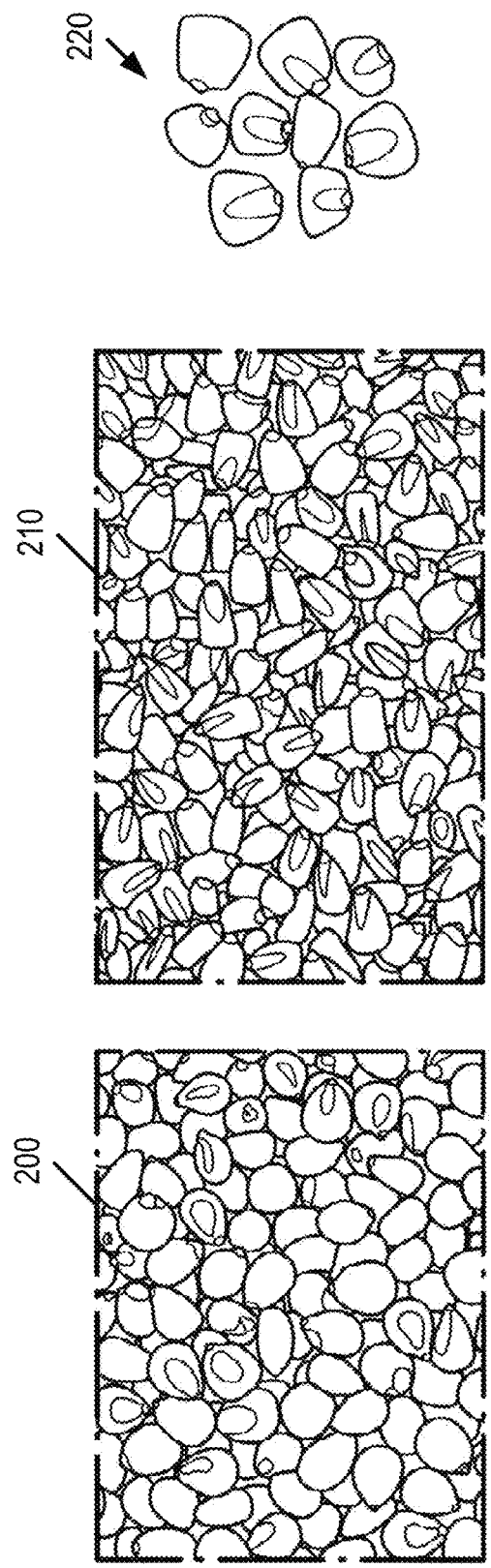
FIG. 2 illustrates various varieties of corn.

The content of these images may differ markedly depending on the type of harvested material; variety-dependent differences may even occur with harvested material of a same kind that make it difficult to estimate the broken grain portion, as the images of various corn varieties in FIG. 2 show. Whereas the grains are somewhat round of a first variety in the left image at 200, a second variety in the middle image at 210 has somewhat slender, more angular grains. The grains of a third variety in the right image at 220 are extremely wide. A classifier calibrated by using grains of the first or the third variety may therefore tend to overestimate the broken portion in the images of the second variety, whereas a classifier calibrated by using the second variety may underestimate the broken portion for the first and third variety.

Figure 3:
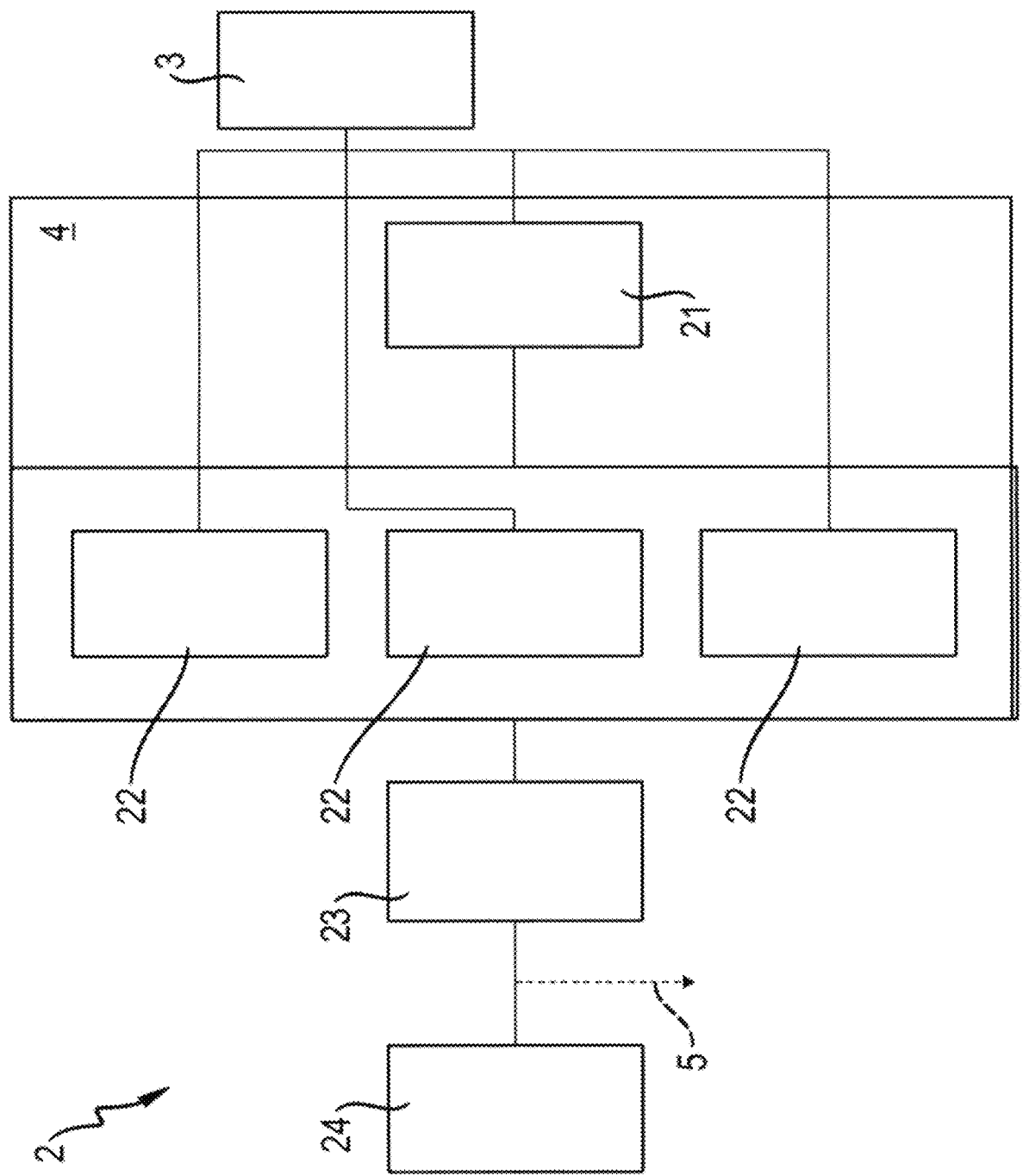
FIG. 3 illustrates a block diagram of a data processing system.

To overcome this problem with less effort, the data processing system 2 includes the design shown in FIG. 3: The evaluation unit 4 (which may comprise at least one processor and at least one memory) comprises a classifier 21, in this case also termed a first-order classifier that is connected to or in communication with the camera 3 in order to receive images of the stream of grain therefrom and to determine the type and/or variety of harvested material by analysis of these images. For each variety that the first-order classifier 21 is able to identify, there is a variety-specific classifier or a second-order classifier 22 that is configured to estimate the broken grain portion in images of grains of this variety, and to output the estimated value and an associated confidence level representative of the reliability of the estimated value. Thus, there is a division of tasks, with the first-order classifier 21 configured to determine the type and the specific variety of harvested material (e.g., of five possible varieties of harvested material, the first-order classifier 21 selects one of the five possible varieties) and with the second-order classifiers 22 each assigned to a respective one of the varieties and configured to estimate the broken grain portion in images of grains (e.g., with five possible varieties of harvested material, there are five second-order classifiers 22, each corresponding to one of the five possible varieties and each trained to estimate the broken grain portion for the respective variety). In one or some embodiments, of the second-order classifiers 22, only one such second-order classifier 22 (that is, only one of the second-order classifiers 22 that is associated with the specific variety (from the five possible varieties) of the harvested material identified by the first-order classifier 21) is active during the operation of the data processing system 2 to process the images supplied by the camera 3; the other second-order classifiers 22 (which are associated with varieties that are different from the specific variety of the harvested material identified by the first-order classifier 21) are inactive so as not to consume any computing power from the data processing system 2.

The term "variety" used in this case is largely synonymous with the term used by seed producers, but not necessarily in every detail. Accordingly, there may be, for example, producer varieties that cannot be distinguished by the appearance of their grains and between which the classifier 21 may therefore not differentiate. On the other hand, if an equivalent producer variety may be harvested in different stages of maturity depending on the intended use, it may be necessary to provide specific classifiers 22 for the stages of maturity.

A user interface 5 may be provided that offers the driver of the combine the option of selecting a certain second-order classifier 22. Accordingly, the driver, if he or she knows the variety to be harvested on the field, may specify this to the data processing system 2 so that the driver may appropriately adjust the diverse or varied operating parameters of the threshing system for the relevant variety before the beginning of the harvest, and a correct evaluation of the images is ensured before the beginning of the harvest. Alternatively or in addition, a network interface may be provided for the same purpose to receive from an external computer information on the type and variety of the harvested material, such as together with required data for autonomously navigating the combine 1 on the field.

In one or some embodiments, the classifiers 21, 22 are each implemented as adaptive AI systems, for example as neural networks. The classifier 21 (e.g., the first-order classifier) may be trained by the manufacturer using images of different types and varieties of harvested material to identify the type and variety of harvested material. In particular, in one or some embodiments, images that are labeled with the different types and different varieties may be used, as part of supervised learning, in order to train classifier 21. The classifiers 22 (e.g., the second-order classifiers) may each be trained using images of the variety specific to them to estimate the broken grain portion. Again, a respective classifier 22 (for a specific variety) may be trained using labeled images of the specific variety with broken grain portions. Alternatively, unsupervised learning may be used.

In one or some embodiments, an auditor 23 decides by comparing the confidence levels output by the active classifier 22 (e.g., the one classifier 22 that is currently active) with a threshold whether the threshold is suitable for the current harvested material, or whether the currently harvested variety might be a different one than the one for which the active classifier 22 is designed. Usefully, in one or some embodiments, the decision is based on an average of confidence levels from a plurality of fresh images.

Responsive to the auditor 23 determining that the threshold is undershot (e.g., the threshold is not met), the auditor 23 activates the first-order classifier 21. If the resources of the data processing system 2 are insufficient to simultaneously operate the two classifiers 21, 22, the classifier 22 may be deactivated when activating the classifier 21; in this instance, there will then not be any available current data on the broken grain portion for a period of time; however, this is not problematic as long as the data's confidence level is low, and it is accordingly uncertain whether an adjustment of the threshing system parameters made by using the determined broken grain portion would actually lead to an improvement in the threshing results.

The first-order classifier 21 uses the images currently provided by the camera 3 to determine the type and variety of the harvested material. Images may be collected for this until a decision may be made with the required confidence level. In one or some embodiments, once a decision is made, the classifier 22 assigned to the identified variety (determined by the first-order classifier) is activated, and the classifier 21 is deactivated.

The data processing system 2 furthermore comprises a control unit 24 that receives the broken grain portions determined by the active classifier 22 to optimize the operating parameters of threshing system using these and if applicable measured data from other sensors. In this regard, the control unit 24, responsive to the determination to modify at least one aspect of the combine 1 (such as any one, any combination, or all of the threshing units 12, the separating device 14 and the cleaning device 16), may generate and send one or more commands in order to modify the operation the at least one aspect of the combine 1 (e.g., modify any one, any combination, or all of the speeds of drums, screens and blower, gap widths, etc.), which may, in turn, optimize the threshing process with respect to throughput, grain loss or broken grain portion. Alternatively or in addition, the user interface 5 may be used to display to the driver the determined broken grain portions (e.g., an image with the determined broken grain portions highlighted using one or more indicia to indicate to the driver the determined broken grain portions) and to allow the driver to make adaptations or modifications to the operating parameters of the threshing system. In this regard, the control unit 24 may perform one or both of: cause modification of at least one aspect of the self-propelled harvester thereby modifying a process (e.g., any one, any combination, or all of a threshing process, a cleaning process, a separating process) of the self-propelled harvester with respect to at least one of throughput, grain loss or the broken grain portion; or cause display of the determined broken grain portions in order to allow a driver of the self-propelled harvester to make adaptations or modifications to operating parameters of the process of the self-propelled harvester.

In one or some embodiments, the approach of dividing up a complex classification problem into subproblems that each may be handled by simple classifiers that may be efficiently trained with little or lesser computing effort and with smaller amounts of data may be expanded in many ways. In particular, each of the classifiers 21, 22 may have an inner or interior design that is similar to that shown in FIG. 3. For example, the problem of variety identification may also be simplified in that the classifier 21 is divided up into a first-order sub-classifier for identifying the type of harvested material, and second-order sub-classifiers for identifying the variety. By way of example, types may comprise corn, wheat, and soy. In such an example, there may be a single first-order sub-classifier configured to determine whether the type is corn, wheat or soy. Further, in such an example, there may be three second-order sub-classifiers, a first second-order sub-classifier for identifying the variety of corn, a second second-order sub-classifier for identifying the variety of wheat, and a third second-order sub-classifier for identifying the variety of soy.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

REFERENCE NUMBERS

1 Combine
2 Data processing system
3 Camera
4 Evaluation unit
5 User interface
6 Harvesting header
7 Grain tank
10 Inclined conveyor
11 Threshing concave
12 Threshing unit
13 Diverter roller
14 Separating device
15 Returns pan
16 Cleaning device
17 Screening level
18 Fan
19 Elevator
21 Classifier
22 Classifier
23 Auditor
24 Control unit
25 Processor
26 Memory

The invention claimed is:

1. A device configured to determine a portion of at least one of broken grain or non-grain components in a stream of harvested material, the device comprising:
a camera configured to generate images of the stream of harvested material; and
an evaluation unit configured to estimate the portion in an image generated by the camera;
wherein the evaluation unit comprises a first-order classifier configured to estimate a first parameter of the stream of harvested material, and a plurality of second-order classifiers assigned to various values of the first parameter to estimate the portion in a stream of harvested material that has the assigned parameter value;
wherein the evaluation unit is configured to:
estimate, using the first-order classifier, at least one value of the first parameter using one or more images of the camera in order to identify a specific variety of crop;
select the second-order classifier, from the plurality of second-order classifiers, using the specific variety of the crop, wherein each of the plurality of second-order classifiers are trained for a respective variety of crop, and wherein the second-order classifier is trained for the specific variety of the crop in order to estimate the portion of the at least one of the broken grain or the non-grain components; and
estimate, using the selected second-order classifier, the portion of the at least one of the broken grain or the non-grain components.

2. The device of claim 1, wherein the evaluation unit is configured to estimate, using the first-order classifier, the value of the first parameter using a first set of images; and
wherein evaluation unit is configured to estimate, using the selected second-order classifier, the portion of one or both of broken grain or non-grain components using a second set of images different from the first set of images.

3. The device of claim 1, wherein the first parameter comprises a discrete number of values; and
wherein each respective value in the discrete number of values has associated at most one second-order classifier such that a number of the second-order classifiers are at most the discrete number.

4. The device of claim 1, wherein the second-order classifier is configured to assign a confidence level to the estimation of the portion of one or both of broken grain or non-grain components.

5. The device of claim 4, wherein the evaluation unit is further configured to:
determine whether the confidence level is less than a threshold; and
responsive to determining that the confidence level is less than the threshold, invoke the first-order classifier.

6. The device of claim 1, wherein the first parameter designates at least one of specific type of the harvested material or specific variety of the harvested material as the value of the first parameter; and
wherein the evaluation unit is configured to select the second-order classifier correlated to at least one of the specific type of the harvested material or the specific variety of the harvested material.

7. The device of claim 1, wherein the first parameter designates a specific type of the harvested material and a specific variety of the harvested material as the value of the first parameter; and wherein the evaluation unit is configured to select the second-order classifier correlated to the specific type of the harvested material and the specific variety of the harvested material.

8. The device of claim 1, wherein the first-order classifier comprises a first-order sub-classifier and a plurality of second-order sub-classifiers;
   wherein the first-order sub-classifier is configured to identify a type, from a plurality of potential types, of the harvested material; and
   wherein the second-order sub-classifiers are configured to identify a variety, from a plurality of potential varieties, of the type of the harvested material.

9. The device of claim 1, wherein the first-order classifier and the second-order classifier are trained by using images of streams of harvested material and known portions of the imaged streams of harvested material.

10. The device of claim 1, wherein the device is configured for installation in a self-propelled harvester; and
    wherein the evaluation unit is further configured to:
        cause modification of at least one aspect of the self-propelled harvester thereby modifying a process of the self-propelled harvester with respect to at least one of throughput, grain loss or the broken grain portion; or
        cause display of the determined broken grain portions in order to allow a driver of the self-propelled harvester to make adaptations or modifications to operating parameters of the process of the self-propelled harvester.

11. A self-propelled harvester comprising:
    at least one of a threshing units, a separating device, or a cleaning device;
    a display; and
    a device configured to determine a portion of one or both of broken grain or non-grain components in a stream of harvested material, the device include:
        a camera configured to generate images of the stream of harvested material; and
        an evaluation unit configured to estimate the portion in an image generated by the camera;
        wherein the evaluation unit comprises a first-order classifier configured to estimate a first parameter of the stream of harvested material, and a plurality of second-order classifiers assigned to various values of the first parameter to estimate the portion in a stream of harvested material that has the assigned parameter value;
        wherein the evaluation unit is configured to:
            estimate, using the first-order classifier, at least one value of the first parameter using one or more images of the camera; and
            select the second-order classifier assigned to the at least one value of the first parameter;
            estimate, using the selected second-order classifier, the portion of one or both of broken grain or non-grain components; and
            perform at least one of:
                cause modification of at least one aspect of the self-propelled harvester thereby modifying a process of the self-propelled harvester with respect to at least one of throughput, grain loss or the broken grain portion; or
                cause display of the determined broken grain portions in order to allow a driver of the self-propelled harvester to make adaptations or modifications to operating parameters of the process of the self-propelled harvester.

12. A method for determining a portion of one or both of broken grain or non-grain components in a stream of harvested material, the method comprising:
    accessing a number of images of a harvested material;
    accessing a first-order classifier that is configured to estimate a first parameter of a stream of harvested material in order to identify one of a plurality of varieties of crop by using at least one image of the stream of harvested material, and a plurality of second-order classifiers, each of the plurality of second-order classifiers are trained for a respective variety of crop and are configured to estimate the portion;
    using the first-order classifier to estimate a value of the first parameter in order to identify a specific variety of crop;
    by using the specific variety of crop, selecting a second-order classifier from the plurality of second-order classifiers, wherein the second-order classifier that is selected is trained for the specific variety of the crop in order to estimate the portion of the at least one of the broken grain or the non-grain components; and
    using the selected second-order classifier in order to obtain an estimated value of the portion of one or both of broken grain or non-grain components.

13. The method of claim 12, wherein the images are sequentially provided by a camera.

14. The method of claim 13, wherein the value of the first parameter is estimated using a first set of images and the first-order classifier; and
    wherein the portion of one or both of broken grain or non-grain components is estimated using a second set of images different from the first set of images and the selected second-order classifier.

15. The method of claim 12, further comprising training each respective second-order classifier by using images of a stream of harvested material whose first parameter has the value assigned to the respective second-order classifier.

16. The method of claim 12, further comprising generating the second-order classifiers by:
    providing an original classifier; and
    generating each of the second-order classifiers from the original classifier by training using images of a stream of harvested material whose first parameter has the value assigned to the second-order classifier.

17. A non-transitory computer-readable medium for determining a portion of one or both of broken grain or non-grain components in a stream of harvested material, comprising instructions stored thereon, that when executed on a processor, perform the steps of:
    accessing a number of images of a harvested material;
    accessing a first-order classifier that is configured to estimate a first parameter of a stream of harvested material in order to identify one of a plurality of varieties of crop by using at least one image of the stream of harvested material, and a plurality of second-order classifiers, each of the plurality of second-order classifiers are trained for a respective variety of the plurality of varieties of crop and are configured to estimate the portion;
    using the first-order classifier to estimate a value of the first parameter in order to identify a specific variety of crop;
    by using the specific variety of crop, selecting a second-order classifier from the plurality of second-order classifiers, wherein the second-order classifier that is selected is trained for the specific variety of the crop in order to estimate the portion of the at least one of the broken grain or the non-grain components; and using the selected second-order classifier in order to obtain an estimated value of the portion of one or both of broken grain or non-grain components.

18. The computer-readable medium of claim 17, wherein the value of the first parameter is estimated using a first set of images and the first-order classifier; and wherein the portion of one or both of broken grain or non-grain components is estimated using a second set of images different from the first set of images and the selected second-order classifier.

19. The computer-readable medium of claim 17, further comprising training each respective second-order classifier by using images of a stream of harvested material whose first parameter has the value assigned to the respective second-order classifier.

20. The computer-readable medium of claim 17, further comprising generating the second-order classifiers by:

providing an original classifier; and generating each of the second-order classifiers from the original classifier by training using images of a stream of harvested material whose first parameter has the value assigned to the second-order classifier.

* * * * *